(12) United States Patent
Choi et al.

(10) Patent No.: US 8,982,438 B2
(45) Date of Patent: Mar. 17, 2015

(54) APPARATUS AND METHOD FOR HOLOGRAPHY 3-DIMENSIONAL DISPLAY

(75) Inventors: Kyu-hwan Choi, Yongin-si (KR); Hoon Song, Yongin-si (KR); Hong-seok Lee, Seongnam-si (KR); Yoon-sun Choi, Yongin-si (KR); Jung-mok Bae, Seoul (KR); Seung-hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 13/267,998

(22) Filed: Oct. 7, 2011

(65) Prior Publication Data

US 2012/0086994 A1 Apr. 12, 2012

(30) Foreign Application Priority Data

Oct. 11, 2010 (KR) ................ 10-2010-0098830

(51) Int. Cl.
| | | |
|---|---|---|
| *G03H 1/08* | (2006.01) | |
| *G03H 1/22* | (2006.01) | |
| *G03H 1/04* | (2006.01) | |
| *G02F 1/03* | (2006.01) | |
| *G02F 1/07* | (2006.01) | |
| *G03H 1/02* | (2006.01) | |

(52) U.S. Cl.
CPC ..... *G03H 1/2294* (2013.01); *G03H 2001/0224* (2013.01); *G03H 2210/30* (2013.01); *G03H 2222/36* (2013.01); *G03H 2225/25* (2013.01)
USPC .................... 359/9; 359/32; 359/35; 359/244

(58) Field of Classification Search
USPC .......................... 359/9, 32, 35, 244
See application file for complete search history.

(56) References Cited

U.S. PATENT DOCUMENTS

| | | | | |
|---|---|---|---|---|
| 4,277,817 | A * | 7/1981 | Hehr | 362/628 |
| 5,172,251 | A | 12/1992 | Benton et al. | |
| 5,303,322 | A | 4/1994 | Winston et al. | |
| 6,172,799 | B1 | 1/2001 | Raj | |
| 6,437,919 | B1 * | 8/2002 | Brown et al. | 359/621 |
| 6,760,134 | B1 | 7/2004 | Schilling et al. | |
| 6,760,135 | B1 | 7/2004 | Payne et al. | |
| 7,218,435 | B2 | 5/2007 | Slinger | |

(Continued)

FOREIGN PATENT DOCUMENTS

| | | |
|---|---|---|
| EP | 2 068 181 A1 | 6/2009 |
| JP | 2002-107658 | 4/2002 |

(Continued)

*Primary Examiner* — Thomas K Pham
*Assistant Examiner* — Cara Rakowski
(74) *Attorney, Agent, or Firm* — NSIP Law (57) ABSTRACT

An apparatus includes a recording light source configured to emit recording beams, an EASLM configured to time sequentially modulate the recording beams emitted from the recording light source according to hologram information corresponding to a 3-dimensional image spatially divided into a plurality of portions, an OASLM configured to include a plurality of regions corresponding to the plurality of the divided portions of the 3-dimensional image and images on a region corresponding to the portions using the modulated recording beams to form a hologram, a scanning optical unit configured to reproduce the hologram formed by the recording beams serially modulated by the EASLM on a reduced scale and transmit the hologram to the regions of the OASLM corresponding to the portions, and a reproducing light source configured to produce a surface light and emit the surface light to the OASLM.

18 Claims, 8 Drawing Sheets

(56) References Cited

U.S. PATENT DOCUMENTS

| | | |
|---|---|---|
| 7,643,189 B2 | 1/2010 | Schwerdtner et al. |
| 2004/0114204 A1* | 6/2004 | Klug et al. ............ 359/15 |
| 2005/0046795 A1 | 3/2005 | Toeppen |
| 2008/0100922 A1* | 5/2008 | Choi et al. ............ 359/665 |
| 2008/0278780 A1* | 11/2008 | Stanley ............ 359/9 |
| 2008/0303180 A1* | 12/2008 | Lee et al. ............ 264/1.27 |
| 2009/0040294 A1 | 2/2009 | Smalley et al. |
| 2009/0231649 A1* | 9/2009 | Sirat ............ 359/9 |
| 2010/0118065 A1* | 5/2010 | Song et al. ............ 345/697 |

FOREIGN PATENT DOCUMENTS

| | | |
|---|---|---|
| KR | 100256657 | 2/2000 |
| KR | 10-2007-0038974 | 4/2007 |
| KR | 10-2009-0108001 | 10/2009 |

* cited by examiner

APPARATUS AND METHOD FOR HOLOGRAPHY 3-DIMENSIONAL DISPLAY

CROSS-REFERENCE TO RELATED APPLICATIONS

This application claims the benefit under 35 U.S.C. §119(a) of Korean Patent Application No. 10-2010-0098830, filed on Oct. 11, 2010, in the Korean Intellectual Property Office, the entire disclosure of which is incorporated herein by reference for all purposes.

BACKGROUND

1. Field

The following description relates an apparatus and method for holography 3-dimensional display.

2. Description of the Related Art 3-dimensional image display devices, more realistically display an image and are increasingly used in fields, such as medical images, games, advertisements, education, and the military. Accordingly, a 3-dimensional image displayed via a method such as a holographic method or a stereoscopic method is being actively studied.

According to a holography method, a coherent signal is recorded and reproduced by overlapping a light incident from an object and a coherent reference light. The holography method is a suitable method for realizing a 3-dimensional image. Since the 1940s when Dennis Gabor, an English scientist, developed the first hologram in, scientists have been conducting research in holography. More recently, multiple holography techniques for displaying a hologram have been developed such as, for example, a pulsed laser hologram for a dynamic image, a stereohologram for a wide spatial view and wide viewing angle, an embossed hologram for mass production, a natural color hologram displaying natural colors, a digital hologram using a digital imaging device, and an electronic holography for displaying an electronic hologram. The electronic holography technique, used since 1990, is possibly one of the imaging techniques of the next generation. According to the electronic holography technique, scanning an image of the object in pixels to form a hologram, sampling and transmitting data contained in the hologram, and reproducing the hologram from the transmitted data reproduces an image of an object on a display device.

However, one of the limitations of the electronic imaging system is that the amount of data contained in the hologram may be too large to be sampled and transmitted effectively by a computer. Thus, research into generating and displaying a hologram by an electro-optical method has been conducted to reduce the amount of data contained in the generated hologram. In addition, research into hologram systems have been conducted. For example, in order to reduce the amount of calculation data in generating a hologram, research into displaying a hologram by eye-tracking, or research into improving the performance of a hologram optical device, including an optically addressable spatial light modulator (OASLM) has been conducted. Also, research in applying the improvement to the electronic holography system has been conducted.

However, other limitations of the electronic holography technique include the resolution of a reproduced image by the electronic holography technique may not be sufficient, the display device of the electronic holography technique may have a narrow viewing angle, and the size of the electronic holography system may be large.

SUMMARY

According to an aspect, an apparatus for holography 3-dimensional display is provided. The apparatus includes a recording light source configured to emit recording beams, an electrically addressable spatial light modulator (EASLM) configured to time sequentially modulate the recording beams emitted from the recording light source according to hologram information corresponding to a 3-dimensional image spatially divided into a plurality of portions, an optically addressable spatial light modulator (OASLM) configured to include a plurality of regions corresponding to the plurality of the divided portions of the 3-dimensional image and images on a region corresponding to the portions using the modulated recording beams to form a hologram, a scanning optical unit configured to reproduce the hologram formed by the recording beams serially modulated by the EASLM on a reduced scale and transmit the hologram to the regions of the OASLM corresponding to the portions, and a reproducing light source configured to produce a surface light and emit the surface light to the OASLM.

The recording light source may emit a blue light or an i-line light.

The EASLM may include a digital micromirror device (DMD), a liquid crystal on silicon (LCoS), or a liquid crystal device (LCD).

The scanning optical unit may include a projection optical unit, a scanning active optical device configured to control a proceeding direction of the modulated recording beam, a beam folding optical panel configured to guide the modulated recording beams incident via the scanning active optical device by an internal total reflection and emit the modulated recording beams at a predetermined position, and a directional optical panel configured to control the direction of the modulated recording beams emitted from the beam folding optical panel.

The projection optical unit may include two convex lenses or Fresnel lenses.

The scanning active optical device may include a variable prism, a variable lens, or a variable grating.

The variable prism may include an electro-wetting device that controls a slope of a refracting surface according to an electrical control.

The beam folding optical panel may include a light guide unit including an incidence surface through which light is incident, a total reflection surface in which the light is totally reflected, and an emission surface facing the total reflection surface and through which the light is emitted.

In response to a light that is incident via the incidence surface being totally reflected by the total reflection surface at least once and proceeds into the light guide unit, an incidence angle at the emission surface may decrease as the number of reflections at the total reflection surface increases, so that the light passes the emission surface.

The light guide unit may be a wedge type in which the distance between the total reflection surface and the emission surface may be reduced at a position farther from the light source.

The directional optical panel may be an inverted prism sheet.

The directional optical panel may include a first layer and a second layer which comprise materials with different refractive indices. A boundary surface between the first layer and the second layer may have a prism pattern.

The reproduced light source may include a light source, and a transparent optical panel configured to face the OASLM and include an incidence surface through which a light from the light source is incident, a total reflection surface in which the incident light is totally reflected, and an emission unit through which the light is emitted.

The transparent optical panel may include a light guide unit that includes the incidence surface and the total reflection surface. The emission unit may be integrally formed with the light guide unit at one surface of the light guide unit.

The emission unit may include a plurality of emission units that protrude from one surface of the light guide unit. The emission unit may have an emission portion with a cross-section larger than that of an incidence portion of a light from the light guide unit.

The cross-section of the emission unit may have a circular, an oval, or a polygonal shape.

The emission units may be more narrowly distributed as the emission units are farther from the light source.

The size of the emission units may increase as the emission units are farther from the light source.

The reproduced light source may be spatially separately disposed from the other elements of the apparatus for holography 3-dimensional display.

The OASLM may include a photosensitive layer and a liquid crystal layer sandwiched between two electrodes.

In another aspect, a method for holography 3-dimensional display is provided. The method includes time sequentially modulating recording beams according to hologram information corresponding to a 3-dimensional image spatially divided into a plurality of portions, reproducing a hologram generated by the modulated recording beams in synchronization with the times sequential modulation of the recording beams and transmitting the hologram to regions of an optically addressable spatial light modulator (OASLM) corresponding to the portions such that the modulated recording beams form a hologram in the regions of the OASLM, and reproducing the hologram recorded in the OASLM by emitting a surface light to the OASLM.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
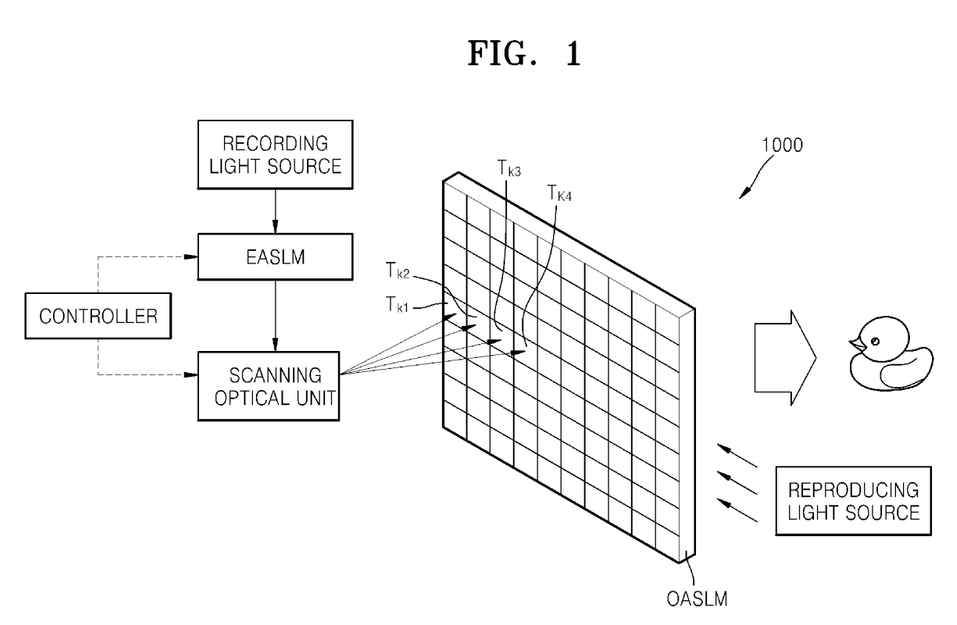
FIG. 1 is a diagram for illustrating an operation of an apparatus for holography 3-dimensional display.

FIG. 1 is a diagram for illustrating an example of an operation of an apparatus for holography 3-dimensional display 1000. A process of displaying a holographic 3-dimensional image includes a recording operation and a reproducing operation. The recording operation includes modulating recording beams emitted from a recording light source by an electrically addressable spatial light modulator (EASLM) and imaging the modulated recording beams on an optically addressable spatial light modulator (OASLM). The reproducing operation includes emitting a reproducing light from a reproducing light source to a hologram formed in the OASLM and displaying a hologram image using the hologram formed in the OASLM and the reproducing light. The recording operation will be described. The EASLM time sequentially modulates the recording beams according to hologram information. The hologram information corresponds to partial images of a multi-dimensional image, such as a 3 dimensional image, of a frame spatially divided into a plurality of portions. For example, a 3-dimensional image of one frame is divided into a plurality of tile regions, and the EASLM time sequentially modulates the recording beams according to hologram information respectively corresponding to a tile region $T_{k1}$, a tile region $T_{k2}$, a tile region $T_{k3}$, and a tile region $T_{k4}$. A scanning optical unit transmits the modulated recording beams to the corresponding regions of the OASLM respectively so that a hologram is formed in the corresponding regions of the OASLM. In other words, the scanning optical unit transmits the modulated recording beams to the corresponding regions in synchronization with the time sequential modulation of the recording beams such that the modulated recording beams form a hologram in each of the regions according to the hologram information respectively corresponding to the tile region $T_{k1}$, the tile region $T_{k2}$, the tile region $T_{k3}$, and the tile region $T_{k4}$. The scanning optical unit transmits recording beams, and a controller controls the direction of the transmitted recording beams.

According to an aspect, the scanning optical unit may have a slim structure suitable for performing the described functions, and the reproducing light source may be integrated with other elements suitable for a TV-type system.

Figure 2:
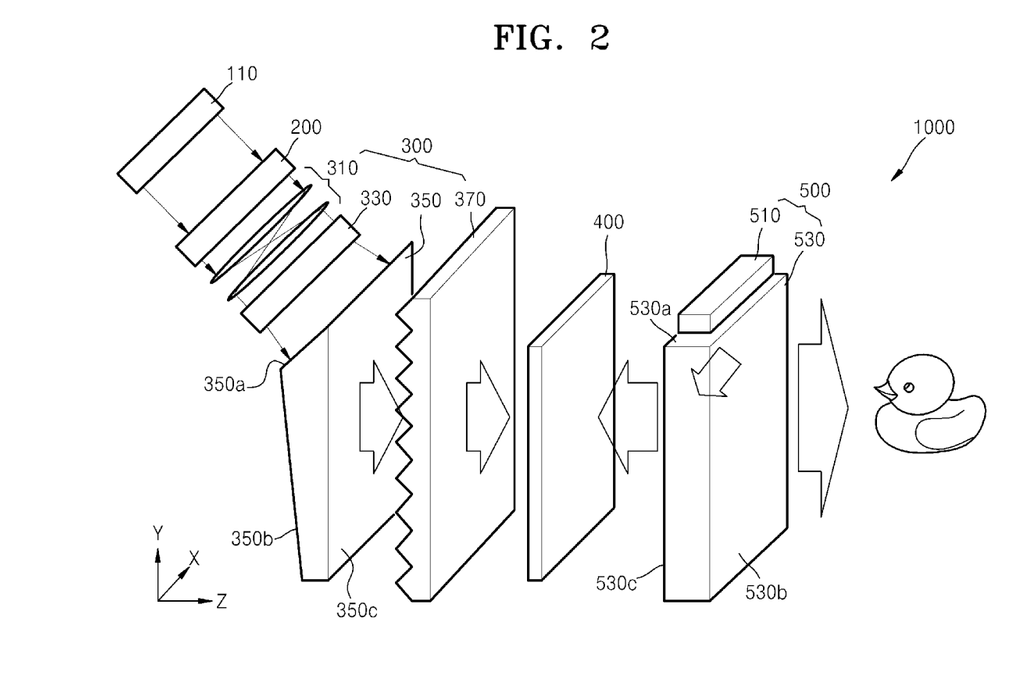
FIG. 2 is a diagram illustrating an apparatus for holography 3-dimensional display.

FIG. 2 is a diagram illustrating an apparatus for holography 3-dimensional display 1000. Referring to FIG. 2, the apparatus for holography 3-dimensional display 1000 includes a recording light source 110 that emits a recording beam, an EASLM 200, an OASLM 400, a scanning optical unit 300, and a reproducing light source 500 that produces a surface light and emits the surface light to the OASLM 400. The EASLM 200 time sequentially modulates the recording beam emitted by the recording light source 110 according to hologram information corresponding to a 3-dimensional image spatially divided into a plurality of portions. The OASLM 400 includes a plurality of regions corresponding to the plurality of the divided portions and images on the regions corresponding to the portions using the modulated recording beams to form a hologram. The scanning optical unit 300 transmits the recording beams modulated by the EASLM 200 to their corresponding regions of the OASLM 400.

The recording light source 110 may be a coherent laser light source, or the recording light source 110 may be an incoherent laser light source. The recording light source 110 may emit a short wavelength light, for example, a blue light or an i-line light. Using the short wavelength light improves resolution of the OASLM 400 more than using a longer wavelength light.

The EASLM 200 modulates the recording beams emitted from the recording light source 110 according to the hologram information. The EASLM 200 may include a digital micromirror device (DMD), a liquid crystal on silicon (LCoS), or a liquid crystal device (LCD). The hologram information provided to the EASLM 200 may be a computer generated hologram.

The OASLM 400 forms a hologram by imaging the light modulated in the EASLM 200 and may include a photosensitive layer and a liquid crystal layer between two electrodes.

The scanning optical unit 300 transmits the hologram formed in the EASLM 200 to the OASLM 400. The scanning optical unit 300 may be an optical system that reproduces the hologram in the OASLM 400 on a reduced scale and may have a slim structure with a small volume. Also, the scanning optical unit 300 may include a projection optical unit 310, a scanning active optical device 330 that controls a proceeding direction of the modulated recording beams, a beam folding optical panel 350, and a directional optical panel 370. The beam folding optical panel 350 guides the modulated recording beams incident via the scanning active optical device 330 by an internal total reflection and emits the modulated recording beam at a predetermined position. The directional optical panel 370 controls the direction of the modulated recording beams emitted from the beam folding optical panel 350.

The projection optical unit 310 reduces or enlarges the modulated recording beams emitted from the EASLM 200 and images on the OASLM 400. As a non-limiting example, the projection optical unit 310 includes two convex lenses referring to FIG. 2. As another example, Fresnel lenses may also be used to constitute the projection optical unit 310.

The scanning active optical device 330 controls a proceeding direction of the modulated recording beams so as to be transmitted to their corresponding regions of the OASLM 400. The scanning active optical device 330 may include a variable prism, a variable lens, or a variable grating.

Figure 3:
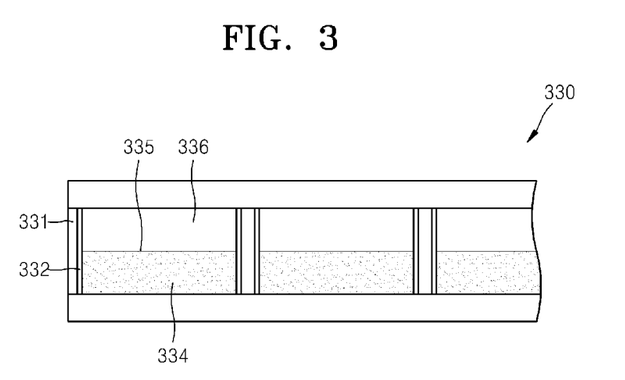
FIG. 3 is a diagram illustrating a scanning optical device used in the apparatus for holography 3-dimensional display of FIG. 2.
Figure 4A:
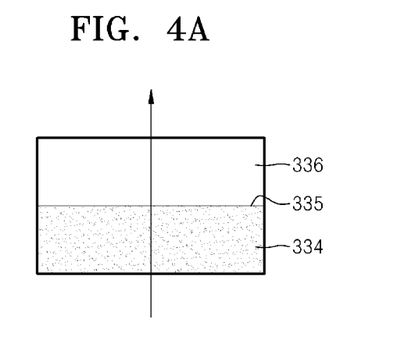
FIGS. 4A to 4E are diagrams illustrating a scanning optical device changing the direction of incident light of FIG. 3.
Figure 4B:
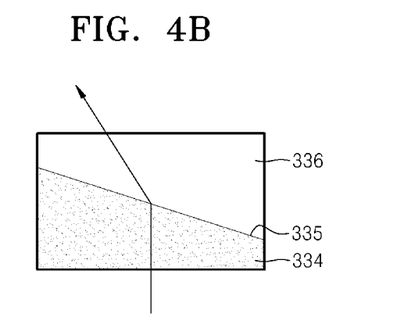
Figure 4C:
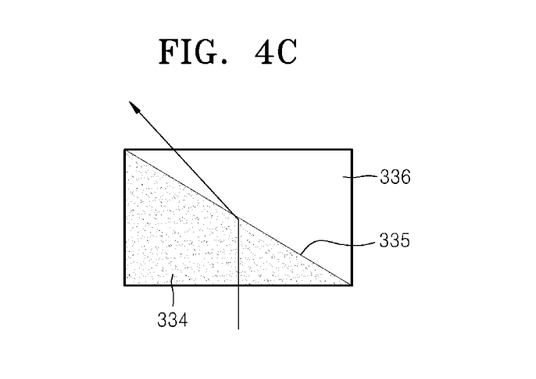
Figure 4D:
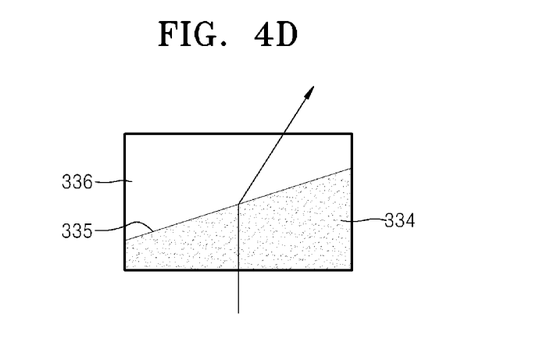
Figure 4E:
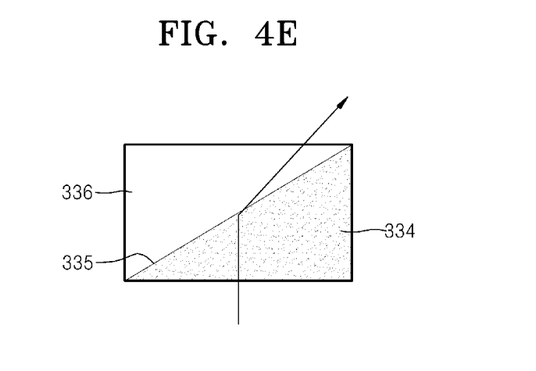

FIG. 3 illustrates a scanning active optical device 330 used in the apparatus for holography 3-dimensional display 1000 of FIG. 2. FIGS. 4A to 4E illustrate the scanning active optical device 330 of FIG. 3 in which the direction of incident light changes. The scanning active optical device 330 may be a variable prism. The variable prism may have a refracting surface 335 with a slope that varies according to an electrical control and may be realized using an electro-wetting phenomenon. The electro-wetting phenomenon is based on a principle that surface tension of a liquid is controlled by electricity. Referring to FIG. 3, the scanning active optical device 330 may include a plurality of cells partitioned by electrodes 331. Each cell includes a polarizable liquid 334, and a non-polar liquid 336. An example of the polarizable liquid 334 may be water, and an example of the non-polar liquid 336 may be oil. A boundary surface between the polarizable liquid 334 and the non-polar liquid 336 may be the refracting surface 335. A dielectric layer 332 is disposed on one surface of the electrode 331. The dielectric layer 332 may have a hydrophobic surface. In response to an electricity being applied to the polarizable liquid 334, polar molecules of the polarizable liquid 334 become more attracted to the electrode 331 due to the electricity, which is generated to change the surface tension of the polarizable liquid 334, such as water. Since water is hydrolyzed into hydrogen and oxygen when water directly contacts with metal of the electrode 331, the dielectric layer 332 is disposed on the surface of the electrode 331 to inhibit water, the polarizable liquid 334, from coming in direct contact with the metal of the electrode 331.

FIGS. 4A to 4E show that the slope of the refracting surface 335 is changed by the electro-wetting phenomenon. The refracting surface 335 is a boundary surface between the polarizable liquid 334 and the non-polar liquid 336. Also, the slope of the refracting surface 335 is controlled by applying voltages to the electrode 331 or by controlling magnitudes of voltages. Accordingly, controlling the slope of the refracting surface 335 may control the emission direction of the incident light beam. This method of controlling the slope of the refracting surface 335 may reduce power consumption and increase a reaction rate, compared to a method of rotating the prism by a mechanical method.

Here, as a non-limiting example, the scanning active optical device 330 may be a variable prism and may control the emission direction using the electro-wetting principle.

Referring back to FIG. 2, the beam folding optical panel 350 is used to form a slim optical device in response to the scanning optical unit 300 reproducing the hologram of the EASLM 200 on a reduced scale and controlling a proceeding direction of light to transmit the light to the OASLM 400. The beam folding optical panel 350 has a structure so that an optical path is folded to reduce volume in response to a light being emitted to a desired position. The beam folding optical panel 350 includes a light guide unit including an incidence surface 350a through which light is incident, a total reflection surface 350b in which the light is totally reflected, and an emission surface 350c facing the total reflection surface 350b and through which the light is emitted. In addition, the directional optical panel 370 may be an inverted prism sheet.

The direction of the light incident into the beam folding optical panel 350 is controlled by the scanning active optical device 330, and the light emitted from the beam folding optical panel 350 along the optical path determined by the controlled direction is collimated by passing through the directional optical panel 370. The optical path will be described with reference to FIG. 5.

Figure 5:
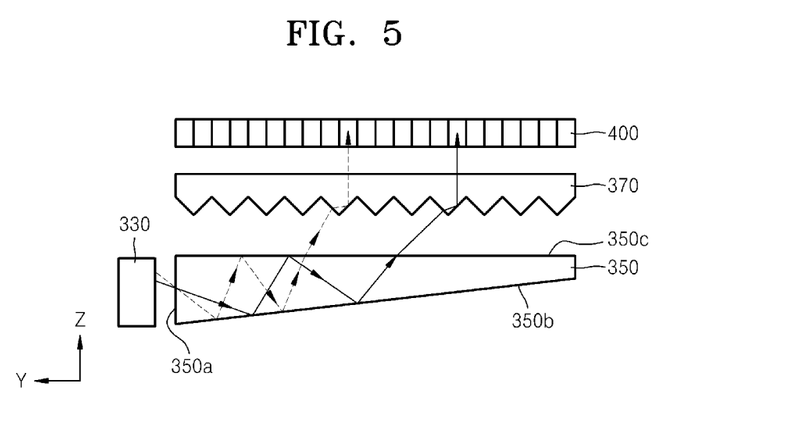
FIG. 5 is a diagram illustrating optical paths of the apparatus for holography 3-dimensional display of FIG. 2 in which recording beams modulated by a scanning active optical device, a beam-folding optical panel, and a directional optical panel are directed on the corresponding regions of an optically addressable spatial light modulator (OASLM) to form an image.

FIG. 5 illustrates optical paths of the apparatus for holography 3-dimensional display 1000 of FIG. 2 in which recording beams modulated by the scanning active optical device 330, the beam-folding optical panel 350, and the directional optical panel 370 are directed on the corresponding regions of the OASLM 400 to form an image.

FIG. 5 shows two optical paths that are controlled by the scanning active optical device 330 and incident in two different directions. Each of the beams following the optical paths is a beam modulated according to hologram information to form a hologram on designated regions of the OASLM 400.

The beam folding optical panel 350 may be a wedge type panel in which the distance between the total reflection surface 350b and the emission surface 350c is reduced at a position farther from the incidence surface 350a. The light that is incident into the beam folding optical panel 350 via the incidence surface 350a is totally reflected by the total reflection surface 330b at least once and proceeds therein. In this regard, as the number of reflections at the total reflection surface 350b increases, an incidence angle at the emission surface 350c decreases, and the light passes the emission surface 350c at a point where the incidence angle is less than a critical angle of total reflection. The optical path is an example of a path, and the light that is incident via the incidence surface 350a may be directly emitted via the emission surface 350c without passing through the total reflection surface 350b.

In addition, variable structure that emits light to designated regions of the OASLM 400 according to the direction controlled by the scanning active optical device 330 may be employed. For example, the total reflection surface 350b or the emission surface 350c may have various reflection patterns or emission patterns.

The light that has passed through the beam folding optical panel 350 may be collimated by the directional optical panel 370 to be incident into the OASLM 400. As a non-limiting example, FIG. 5 shows an inverted prism sheet as the directional optical panel 370. As another aspect, as long as the directional optical panel 370 collimates the light other implementations are within the scope of the teachings herein.

Figure 6:
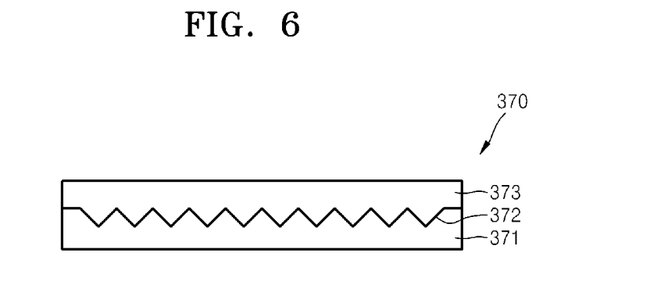
FIG. 6 is a diagram illustrating another directional optical panel used in the example of the apparatus for holography 3-dimensional display of FIG. 2.

FIG. 6 illustrates another directional optical panel 370 used in the apparatus for holography 3-dimensional display 1000 of FIG. 2. The directional optical panel 370 includes a first layer 371 and a second layer 373. The first and second layers 371 and 373 are formed of materials with different refractive indices. A boundary surface between the first layer 371 and the second layer 373 may have a prism pattern 372. As such, the collimating efficiency of light may be adjusted based on the difference of the refractive indices. In this regard, the refractive index of the second layer 373 may be greater than the refractive index of the first layer 371.

Referring back to FIG. 2, a hologram formed in the OASLM 400 is reproduced as a 3-dimensional image when a reproducing light is emitted to the OASLM 400 from the reproducing light source 500. The reproducing light source 500 includes a light source 510 and a transparent optical panel 530. The transparent optical panel 530 converts the reproduced light emitted from the light source 510 to a surface light to emit a light to the OASLM 400. The transparent optical panel 530 may be transparent so that the 3-dimensional image reproduced by the OASLM 400 may be viewed by observers. The transparent optical panel 530 includes an incidence surface 530a through which the reproduced light from the light source 510 is incident, a total reflection surface 530b in which the incident light is totally reflected so that the light proceeds in the transparent optical panel 530, and an emission surface 530c facing the OASLM 400 and through which the light is emitted. An emission unit that has a pattern for emitting the reproduced light that proceeds in the transparent optical panel 530 and is converted into a surface light may be disposed on the emission surface 530c. The pattern for emitting the reproduced light will be described with reference to FIGS. 7 and 8.

Figure 7:
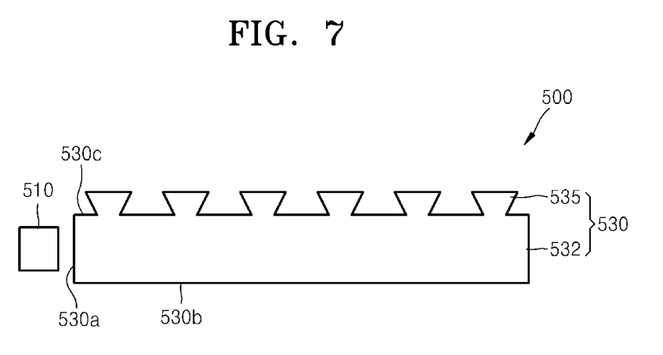
FIGS. 7, 8, 9A-9C, 10, and 11 are diagrams illustrating examples of reproducing light source units used in the apparatus for holography 3-dimensional display of FIG. 2.
Figure 8:
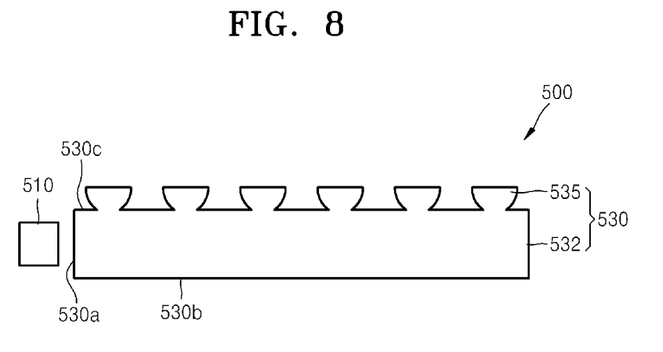

FIGS. 7 and 8 illustrate reproduced light sources 500 used in the apparatus for holography 3-dimensional display 1000 of FIG. 2.

The light source 510 may be a linear light source such as a cold cathode fluorescent lamp (CCFL), a laser diode (LD), a light emitting device (LED), or an organic light emitting device (OLED).

Figure 9A:
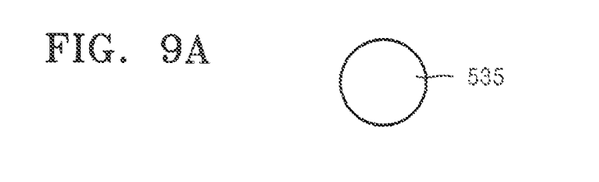
Figure 9B:
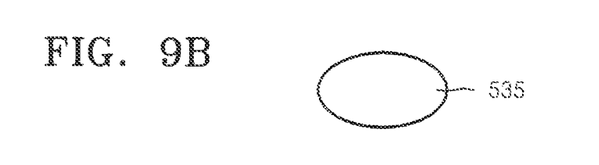
Figure 9C:
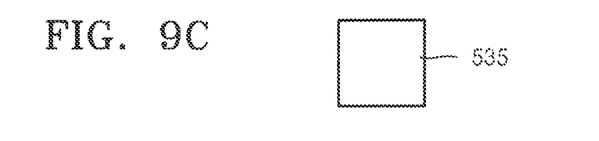
Figure 10:
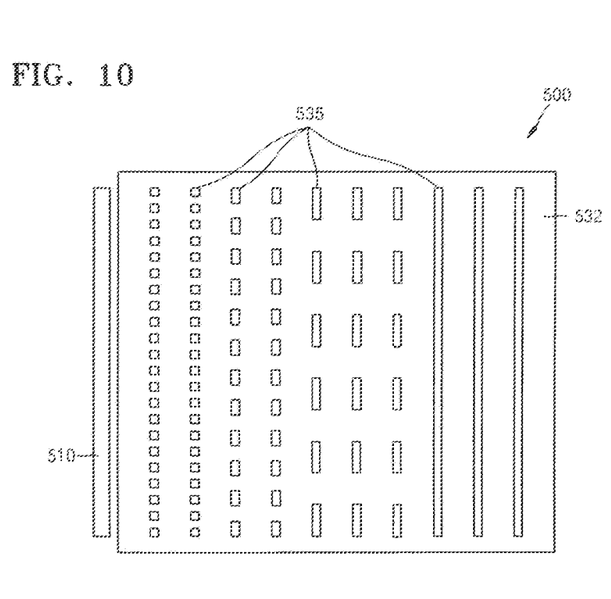
Figure 11:
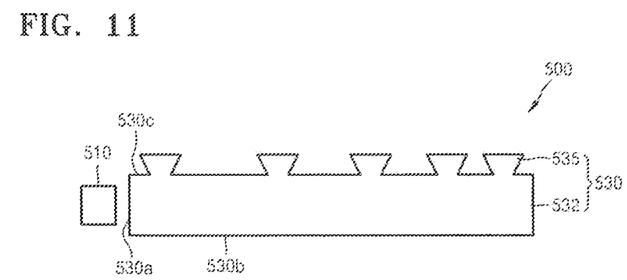

The transparent light guide plate 530 includes a light guide unit 532 and a plurality of emission units 535 that protrude from one surface of the light guide unit 532. The light guide unit 532 may be formed of a transparent material such as polymethyl methacrylate (PMMA), poly carbonate (PC), or silicon rubber. The emission unit 535 may be formed of the same material used to form the light guide unit 532. The light incident into the incidence surface 530a is emitted via the plurality of emission units 535. The emission units 535 may be integrally formed with the light guide unit 532. The emission unit 535 may have an emission portion with a cross-section larger than that of an incidence portion of the light from the light guide unit 532. In one example, a side surface of the emission unit 535 may be flat as shown in FIG. 7. In another example, a side surface of the emission unit 535 may be curved as shown in FIG. 8. Although the cross-section of the emission unit 535 is not shown in FIGS. 7 or 8, the cross-section may have a circular, an oval, or a polygonal shape, as illustrated in FIGS. 9A-9C. The emission units 535 have a uniform size and are uniformly distributed herein. As another aspect, the size and distribution of the emission units 535 may vary for a uniform distribution of the emitted surface light. For example, as shown in FIGS. 10 and 11, the emission units 535 may be more narrowly distributed or the size of the emission units 535 may increase as the emission units 535 are farther from the light source 510.

The reproducing light source 500 may be an example of a transparent surface light source. It is within the scope of the teachings herein that the reproducing light source 500 may be modified in various ways. In addition, the reproduced light source 500 may be integrally formed with other elements of the apparatus for holography 3-dimensional display 1000 to form a slim TV. As another example, the reproducing light source 500 may have a different structure. That is, the reproducing light source 500 may be spatially separately formed from the other elements of the apparatus for holography 3-dimensional display 1000. In this regard, since the reproducing light source 500 is not disposed on the front surface of the OASLM 400, the reproducing light source 500 may not be transparent and may have various shapes.

According to an aspect, the apparatus for holography 3-dimensional display is provided that may more efficiently record and reproduce a hologram by improving integration of each of the optical devices and light sources, and may have a slim optical system with a reduced volume.

According to another aspect, the apparatus for holography 3-dimensional display is provided that may be more efficiently fabricated as a TV.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for holography 3-dimensional display comprising:
    a recording light source configured to emit recording beams;
    an electrically addressable spatial light modulator (EA-SLM) configured to time sequentially modulate the recording beams according to hologram information, the hologram information comprising information regarding a plurality of partial images which are divided from a 3-dimensional image;
    an optically addressable spatial light modulator (OASLM) comprising a plurality of regions corresponding to the plurality of partial images;
    a scanning optical unit configured to transmit the modulated recording beams to the plurality of regions of the OASLM, in synchronization with the time sequential modulation of the recording beams; and a reproducing light source unit configured to produce a surface light and emit the surface light to the OASLM, wherein the reproducing light source unit comprises:

a light source; and a transparent optical panel configured to face the OASLM and comprise an incidence surface through which a light from the light source is incident, a total reflection surface in which the incident light is totally reflected, and an emission unit through which the light is emitted, surface of the emission unit being parallel to a surface of the OASLM and facing the surface of the OASLM entirely, wherein the scanning optical unit comprises:

a projection optical unit:

a scanning active optical device configured to control a proceeding direction of the modulated recording beam;

a beam folding optical panel having an incidence surface through which the modulated recording beam is incident and an emission surface through which the modulated light beam is output, the beam folding optical panel being configured to guide the modulated recording beams incident via the incidence surface by an internal total reflection and to emit the modulated recording beams at a predetermined position of the emission surface: and a directional optical panel configured to control the direction of the modulated recording beams emitted from the beam folding optical panel, and wherein the modulated recording beam is refracted at the incidence surface of the beam folding optical panel.

2. The apparatus of claim 1, wherein the recording light source emits a blue light or an i-line light.

3. The apparatus of claim 1, wherein the EASLM comprises a digital micromirror device (DMD), a liquid crystal on silicon (LCoS), or a liquid crystal device (LCD).

4. The apparatus of claim 1, wherein the projection optical unit comprises two convex lenses or Fresnel lenses.

5. The apparatus of claim 1, wherein the scanning active optical device comprises a variable prism, a variable lens, or a variable grating.

6. The apparatus of claim 5, wherein the variable prism comprises an electro-wetting device configured to control a slope of a refracting surface according to an electrical control.

7. The apparatus of claim 1, wherein the beam folding optical panel comprises a light guide unit comprising the incidence surface through which light is incident, a total reflection surface in which the light is totally reflected, and the emission surface facing the total reflection surface and through which the light is emitted.

8. The apparatus of claim 7, wherein in response to a light that is incident via the incidence surface being totally reflected by the total reflection surface at least once and proceeds into the light guide unit, an incidence angle at the emission surface decreases as the number of reflections at the total reflection surface increases, so that the light passes the emission surface.

9. The apparatus of claim 7, wherein the light guide unit is a wedge type in which the distance between the total reflection surface and the emission surface is reduced at a position farther from the light source.

10. The apparatus of claim 1, wherein the directional optical panel is an inverted prism sheet.

11. The apparatus of claim 1, wherein the directional optical panel comprises a first layer and a second layer which comprise materials with different refractive indices, wherein a boundary surface between the first layer and the second layer has a prism pattern.

12. The apparatus of claim 1, wherein the transparent optical panel comprises a light guide unit that comprises the incidence surface and the total reflection surface, wherein the emission unit is integrally formed with the light guide unit at one surface of the light guide unit.

13. The apparatus of claim 12, wherein the emission unit comprises a plurality of emission units that protrude from one surface of the light guide unit, wherein the emission unit has an emission portion with a cross-section larger than that of an incidence portion of a light from the light guide unit.

14. The apparatus of claim 13, wherein the cross-section of the emission unit has a circular, an oval, or a polygonal shape.

15. The apparatus of claim 13, wherein the emission units are placed more closely together as the emission units are farther from the light source.

16. The apparatus of claim 13, wherein the size of the emission units increases as the emission units are farther from the light source.

17. The apparatus of claim 1, wherein the reproducing light source is spatially separately disposed from the other elements of the apparatus for holography 3-dimensional display.

18. The apparatus of claim 1, wherein the OASLM include a photosensitive layer and a liquid crystal layer sandwiched between two electrodes.

* * * * *